United States Patent
D'Sa et al.

(10) Patent No.: US 6,715,064 B1
(45) Date of Patent: Mar. 30, 2004

(54) METHOD AND APPARATUS FOR PERFORMING SEQUENTIAL EXECUTIONS OF ELEMENTS IN COOPERATION WITH A TRANSFORM

(75) Inventors: Reynold V. D'Sa, Portland, OR (US); Slade A. Morgan, Forest Grove, OR (US); Alan B. Kyker, Portland, OR (US); Gad S. Sheaffer, Haifa (IL); Gustavo P. Espinosa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/489,072

(22) Filed: Jan. 21, 2000

(51) Int. Cl.[7] .............................................. G06F 15/00
(52) U.S. Cl. ................................................... 712/240
(58) Field of Search ................. 712/239, 240, 712/233, 234

(56) References Cited

U.S. PATENT DOCUMENTS

| | | | |
|---|---|---|---|
| 5,553,253 A | * | 9/1996 | Pan et al. .................... 712/240 |
| 5,687,360 A | | 11/1997 | Chang |
| 5,758,142 A | | 5/1998 | McFarling et al. |
| 5,822,577 A | | 10/1998 | Ekanadham et al. |
| 6,272,623 B1 | * | 8/2001 | Talcott ....................... 712/239 |

* cited by examiner

*Primary Examiner*—Richard L. Ellis
*Assistant Examiner*—Tonia L. Meonske
(74) *Attorney, Agent, or Firm*—Blakely, Sokoloff, Taylor & Zafman LLP (57) ABSTRACT

A method and apparatus for predicting the outcome of a branch instruction based on the branch history of preceding branch instruction. As a sequence of instructions passes through an instruction execution pipeline, a base branch instruction is chosen, a history index is generated for the base branch instruction and subsequent branch instructions, and a transform is created for the branch instruction to be predicted. When the sequence of instructions subsequently passes through the pipeline again, the transform is used to operate on the history index of the base branch instruction to produce a history index for the branch to be predicted. The result is used as an index into a prediction array to access the prediction logic for the branch instruction being predicted. By using the predetermined transform, a branch status prediction can be made before the branch to be predicted reaches the normal prediction stage in the pipeline.

23 Claims, 5 Drawing Sheets

METHOD AND APPARATUS FOR PERFORMING SEQUENTIAL EXECUTIONS OF ELEMENTS IN COOPERATION WITH A TRANSFORM

BACKGROUND OF THE INVENTION

1. Field of the Invention

The invention pertains generally to computer processing. In particular, it pertains to making predictions of processing steps using global predictors.

2. Description of the Related Art

One of the techniques used to increase overall procesor speed is the well-known use of instruction execution pipelines. Since the execution of each instruction is actually a series of sequentially executed sub-steps, an assembly line process can be used. Instructions are fed into the input of an execution pipeline with a series of stages. Each stage performs one of the sub-steps and then passes the instruction to the next stage for performing the next sub-step. A simplified example would be: first stage—decode the instruction type, second stage—retrieve relevant data, third stage—operate on the data, fourth stage—store the result. Most actual pipelines have many more stages than this, for example twenty stages, with each stage performing a simpler task than those just recited. Multiple instructions can be in the pipeline at the same time, each undergoing a different sub-step in a different stage at the same time, so overall throughput is much higher than if each instruction had to be completed before the next could be started.

If an instruction is a conditional branch instruction, the selection of instructions hat should immediately follow it in the pipeline depends on whether or not the branch is taken. The fact that an instruction is a branch instruction is determined early in the pipeline, but whether the branch will be taken is not determined until the later stages of the pipeline, after several of the subsequent instructions have already been loaded into the pipeline. Because of this, microprocessor architectures incorporating instruction execution pipelines usually include some methodology for predicting the outcome of branch instructions so that the program instructions that are predicted to follow the branch instruction can be loaded into the pipeline. If the prediction is wrong, the instructions behind the branch instruction must be flushed from the pipeline and the correct instructions then loaded, thereby causing a delay. Thus, the accuracy of the predictive method is important to the performance of the system.

One conventional predictive approach is to look at a predetermined number (N) of branches immediately preceding the current branch, and then use the pattern of branching within that group as an index into a predictive logic array that actually predicts the branch status (branch or don't branch) of the branch instruction. For example, a global history array may be used to keep an ongoing track of the behavior of an N number of branches preceding each branch to be predicted. The contents of the history array can then be used as an index into a prediction array, with each location in the prediction array containing prediction logic for the specific branch being indexed. To make each index unique to a specific branch and also history-dependent, each branch's history index can be operated on by a unique parameter such as the branch's instruction pointer, to produce the index for the next branch. Thus, the history index for a given branch instruction is based partly on the branching path leading up to that branch instruction. If the branch history generation logic misses a particular branch, all the following branch prediction indexes will be corrupted, and the global history generation process must be restarted.

Figure 1:
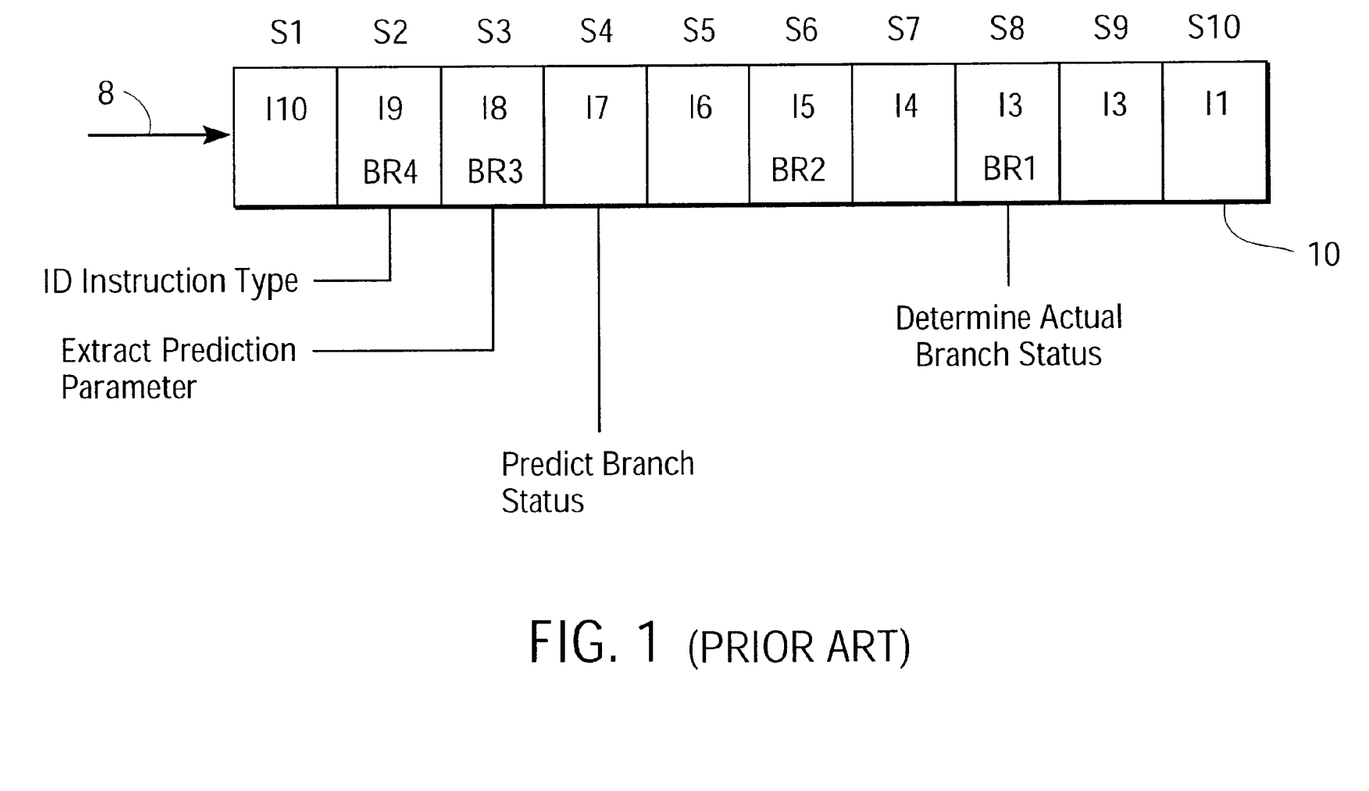
FIG. 1 shows an instruction execution pipeline of the prior art.

The difficulty of using this prediction method with an instruction execution pipeline is shown in FIG. 1. FIG. 1 shows an instruction execution pipeline 10 with ten stages labeled S1–S10. At stage S2, the type of instruction (such as a conditional branch instruction) is identified. If the instruction is a branch instruction, at stage S3 the parameter for predicting the branch status is extracted. At stage S4, the prediction of branch status is actually made. At stage S8, the actual branch status of the branch instruction can be identified, and the possibility of a pipeline flush becomes evident.

Ten instructions I1–I10 have been sequentially loaded into the pipeline at input 8, and are progressing through the pipeline from left to right. In the example shown, instructions I3, I5, I8 and I9 are branch instructions labeled BR1, BR2, BR3 and BR4, respectively. As soon as BR4 enters the pipeline at stage 1, its branching status needs to be predicted so the instructions following BR4 can be determined and loaded into the pipeline immediately after it. If an accurate prediction is to be made for BR4, two conventional approaches are typically used: 1) Wait until BR4 reaches stage 4 to make a prediction. This reduces the effectiveness of making a prediction, since stages S1–S3 will be initially filled without the benefit of the prediction, and a pipeline flush of these stages is likely. 2) Maintain information on every branch needed to identify the branch and create its global history, so that the global histories of BR2 and BR3 can be generated and used to generate a global history for BR4 in pipeline stage S1. This requires extensive circuitry for the prediction logic, since data must be kept for every branch instruction, and if information for BR2 and BR3 is missing due to cache capacity issues or for any other reason, BR4 gets a corrupted global history that negatively impacts performance.

SUMMARY OF THE INVENTION

The invention includes a method of providing at least three elements, including first and last elements, with each element having an associated parameter, and further providing an index for the first element. For the first sequential execution of the elements, a first operation is performed on the first index and at least one of the parameters to produce a transform. The transform is then saved. For the second sequential execution of the elements, a second operation is performed on the transform to produce a last index, which is associated with the last element.

DETAILED DESCRIPTION OF THE INVENTION

The present invention can be used to predict the performance of a decisional element based on the historic performance of preceding decisional elements, when information from the most recent elements is not available. In particular, the invention can be used to make branch predictions for branches in an instruction execution pipeline when the information from some of the branches normally used in the prediction are not yet available to the prediction logic.

In an instruction pipeline, information for some number of branches preceding a branch to be predicted may not be available at an early stage of the pipeline when a global history for the branch to be predicted is required by the predictor. However, some preceding branches will have advanced far enough in the pipeline that their global histories will be known. In a given design, it may be possible to identify a 'base' branch preceding a specific incarnation of a branch to be predicted which has these properties: 1) the specific incarnation of the branch to be predicted will never be encountered except through the base branch and a fixed set of instructions between the base branch and the branch to be predicted, and 2) the global history information for the base branch can be guaranteed to be available at the time that the specific incarnation of the branch to be predicted reaches the predictor. The present invention takes advantage of the fact that if such a base branch can be identified, it is possible during an initial pass through a stream of instructions to generate a transform such that on subsequent passes through the stream of instructions the transform can be combined with the global history of the base branch to produce the global history of the branch to be predicted, despite the fact that information relevant to the creation of global histories for branches between the base branch and the branch to be predicted is not available. Various methods can be used to create base branches with the properties described above.

Using the example of FIG. 1, suppose the particular branch to be predicted is instruction 9 in a pipeline that contains 10 instructions, of which instructions I3, I5 and I8 are also branches. The branch instructions are labeled BR1, BR2, BR3 and BR4, respectively. The conventional way to determine the global history index for BR4 is to progressively generate the prediction index from the branch history indexes of branches BR1, BR2 and BR3. However, this provides difficulties with an instruction execution pipeline because a branch prediction for BR4 is required when BR4 is in stage S1 (so the predicted subsequent instructions can be identified and immediately loaded behind BR4), but the pipeline does not have enough available information to predict BR4 until BR4 reaches stage S4.

Instead, the present invention uses a consolidated transform to generate the global history index for BR4 based upon the global histories that were determined during a previous pass through the instruction sequence. As used herein, the term 'transform' is a label that refers to a particular value, or set of values, that are used to derive the desired data from the available data. On one pass through the instruction sequence, the transform for BR4 is generated. On a subsequent pass, as soon as BR4 is detected entering stage S1, the branch prediction unit can provide the associated transform and immediately generate the index for BR4 without waiting for the branch prediction stage of the pipeline to process BR4, and without considering BR2 and BR3.

Figure 2:
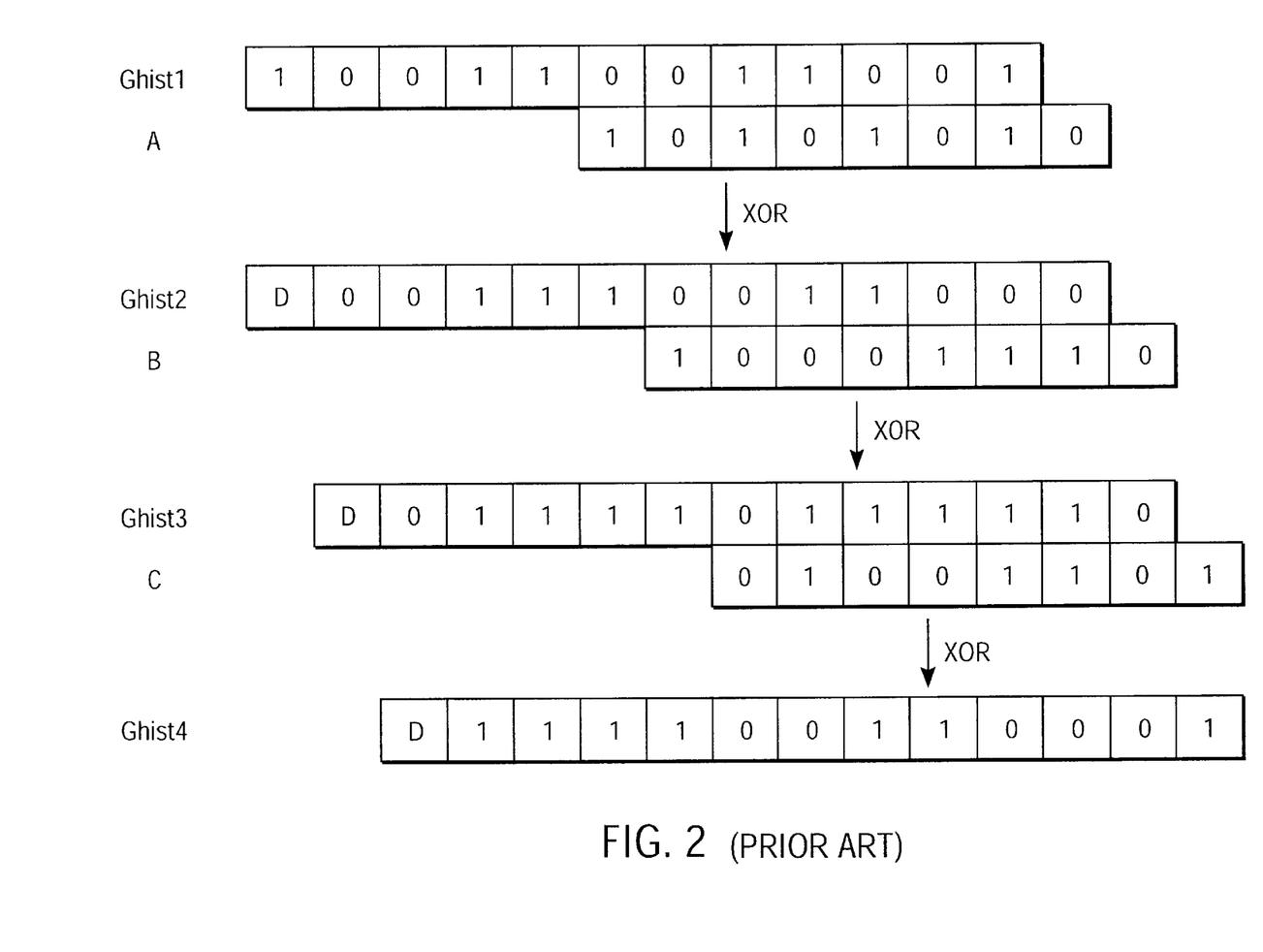
FIG. 2 shows a process flow of the prior art for producing global history indexes.

FIG. 2 shows how to generate a global history index for each branch in the sequence. Each branch in the trace has an associated history index Ghist(x) and an associated parameter X. Ghist1 represents the global history index for branch BR1 that has been designated as the first, or base, branch in the process. Ghist4 represents the index for the fourth branch instruction, BR4, which is the branch instruction to be predicted and can be referred to as the current branch instruction. Ghist2 and Ghist3 represent the global history indexes for the intermediate second and third branches in the instruction sequence, labeled BR2 and BR3, respectively. All branches of interest in the instruction sequence may have an associated index and parameter, but for clarity of explanation, only the first four branches are shown in this example. All branches shown in the example and referred to in this disclosure are branches "of interest", meaning these are the branches chosen for use in the prediction process. They might include every branch, every conditional branch, or a subset of one or both of those. Some branches might be ignored. The method of selecting which branches are of interest is a design choice that is beyond the scope of this disclosure.

A, B, and C are constants chosen as the parameters associated with branch instructions BR1, BR2, and BR3, respectively (and by inference, associated with Ghist1, Ghist2 and Ghist3, respectively). In one embodiment, these parameters are the instruction pointers for the branches, since the values of the instruction pointers are relatively unique and are available to the predictor. Other methods of choosing these constants can also be used. BR4 and any subsequent branch instructions can also have associated parameters, but they are not used in this example and are therefore not described.

The index for the branch to be predicted (index Ghist4 for branch BR4 in the example) can be used as a pointer into a prediction array that contains decision logic for implementing the branch-don't branch prediction for BR4. In one embodiment, this decision logic contains a saturating counter in each location of the array. The use of saturating counters in prediction logic is known in the art and is not further described herein.

As seen, each branch's index can be derived from the previous branch's index and its associated parameter. Since the process described herein does not comprehend the branch instructions preceding the base branch, the base branch's history index can initially be derived in other ways, whose details are not important to the practice of the invention. However, the global history for the base branch must be available by the time the current branch reaches the prediction stage of the pipeline (stage 4 in FIG. 1).

A process followed in the prior art for producing global history indexes is shown in FIG. 2. As shown, each successive index is derived by using a shift-and-exclusive-OR operation. In this embodiment, an index is shifted one bit to the left and then an exclusive OR (XOR) function is performed on the shifted index value and the associated parameter. For example, Ghist1, the index for BR1, is shown in FIG. 2 to be 100110011001. The associated parameter A for Ghist1 is shown to be 10101010. In one embodiment, each parameter is the program counter for the branch instruction associated with that index Ghist(x). Shifting Ghist1 (100110011001) to the left relative to associated parameter A and then performing an exclusive OR operation on it with parameter A (10101010) produces the quantity 001110011000, which becomes the index Ghist2 for branch instruction BR2. The most significant bit of Ghist2 is labeled 'D' (for "Don't care") rather than '1', because its value is not used. It may be shifted out and lost before or after the XOR operation, so that the 'D' bit will be not be a part of the result. Also, instead of shifting Ghist1 to the left, the parameter A can be shifted one bit to the right relative to Ghist1. As long as the proper bits are maintained, the physical implementation of the shift operation is a trivial variation, well within the capabilities of a person of ordinary skill in the art.

Repeating this process, the newly-derived value of Ghist2 is then shifted one bit and XOR'd with its associated parameter B, which is shown as 10001110, producing the result. 011110111110. This result becomes Ghist3, the index for the third branch instruction in the sequence. Again, the value of the most significant bit can be ignored or discarded.

The newly-derived value of Ghist3 is then shifted one bit and XOR'd with its associated parameter C, which is shown as 01001101, producing the result 0111100110001. The most significant bit is again ignored. The final result of 111100110001 becomes Ghist4, the index for the fourth branch instruction in the sequence. Since Ghist4 is the index for branch instruction BR4, it can be used as an index into a global history array that provides the branch prediction logic for BR4. Ghist4 can also have an associated parameter, and the just-described process can be repeated to produce branch predictions for subsequent branch instructions.

Figure 3:
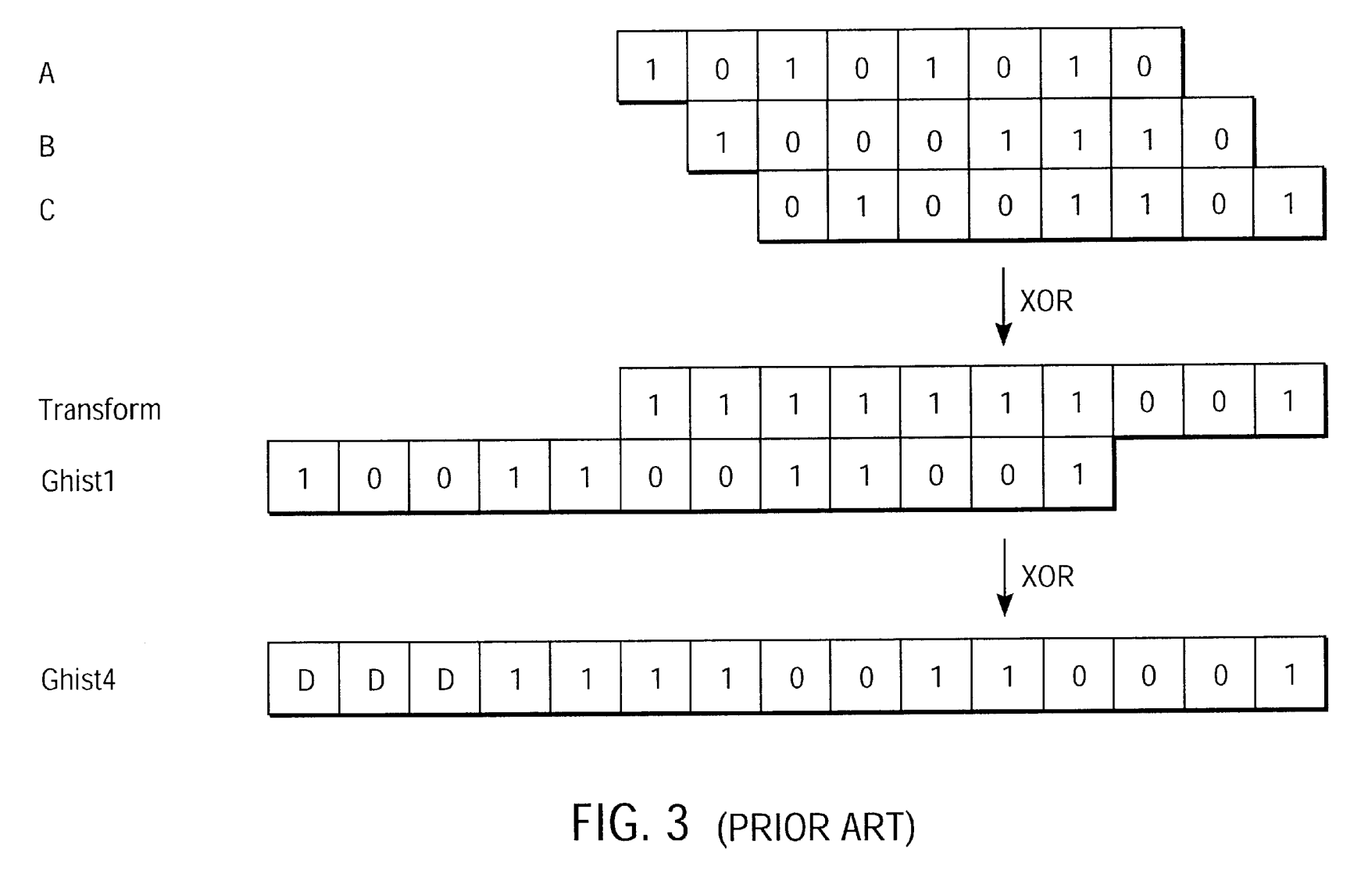
FIG. 3 shows a process flow for deriving a transform.

FIG. 3 shows how the nature of exclusive OR operations can be used to abbreviate the approach of FIG. 2. Rather than generating history indexes for Ghist2 and Ghist3, the parameters A–C associated with Ghist1–3 can each be shifted one bit to the left relative to the subsequent parameter and the three parameters XOR'd together to produce the combined transform 1111111001. This action is performed by shifting the base parameter A one bit to the left relative to the next parameter B to produce an intermediate shifted parameter, and performing an XOR operation on the intermediate shifted parameter and parameter B to produce an intermediate transform. This intermediate transform is then shifted one bit to the left relative to parameter C to produce a new intermediate shifted parameter and an XOR operation is performed on this new intermediate shifted parameter and parameter C to produce a final transform. The final transform can be saved in the global history array and later used with Ghist1 to produce Ghist4 in a single operation. In this single operation, base index Ghist1 can be shifted three bits to the left (one bit for each of the parameters used) to produce a shifted index. The final transform can then be XOR'd with this shifted index to directly produce Ghist4= 100111100110001. In keeping with the previous practice of ignoring the most significant bit at each stage, the three most significant bits (MSB's) of Ghist4 can be discarded (one MSB for each of the parameters used to derive the transform). The final result for Ghist4 is therefore 111100110001, the same result obtained in the process of FIG. 2.

In practice, a base branch instruction is chosen and it's global history index is determined. The choice of base branch can be made using various criteria, which are not important to the following description. As the second, third, fourth, etc. branch instructions are encountered at stage S1 of the pipeline, history indexes for each branch instruction are generated. These may represent every branch encountered in the instruction sequence, or may represent only those branches meeting a predetermined criteria. For illustration purposes, we assume here that BR1 is the base branch, and BR4 is the first branch for which we will make a prediction. Branches BR1–3 might be monotonic branches, which don't require a prediction, or might not be predicted for some other reason.

Once the transform of FIG. 3 has been generated, it can be saved in the global history array in a location associated with BR4. On a subsequent pass through this sequence of instructions, in which Ghist1 was selected as a base for BR4 because it was known to be available at the time BR4 would require prediction, Ghist1 can be operated on with the saved transform to produce Ghist4, the prediction index for BR4. Thus, the Ghist4 can be predicted immediately without waiting for BR4 to reach the normal prediction stage of the pipeline, and without even acknowledging the existence of BR2 and BR3. Ghist4 is then used as an index into the branch prediction logic to predict whether BR4 will branch or not, and the instructions to follow BR4 in the pipeline are thus determined in time to load them into the pipeline immediately behind BR4.

Concurrently with the process of the preceding paragraph, a new transform can be calculated for a subsequent pass through this sequence of instructions using the previously described process.

The preceding example assumes that two intermediate branches are located between the base branch and the branch to be predicted. Since the process is iterative, other quantities of intermediate branches can easily be used, including zero intermediate branches, without departing from the spirit or scope of the invention.

Figure 4:
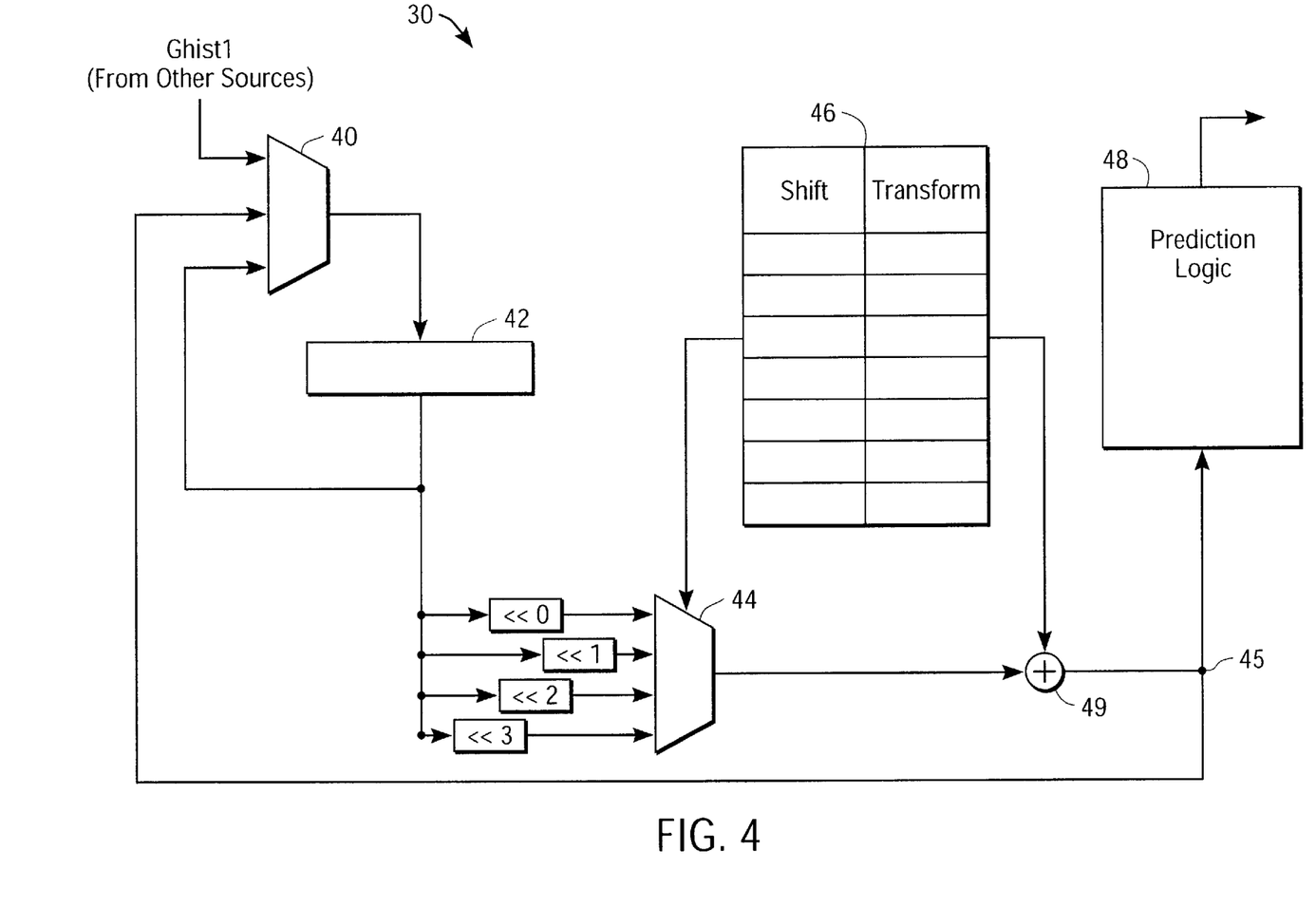
FIG. 4 shows a prediction circuit of the invention.

FIG. 4 shows prediction circuit 30 of the invention for predicting a branch. A multiplexer 40 selects a base history index from one of several sources for placement in register 42. Rather than actually shifting the contents of register 42 with a shift register, a data shifting circuit in the form of a four-to-one multiplexer 44 can be used to perform the shift while the data is being transferred from register 42 to exclusive OR (XOR) circuit 49. The symbols <<0, <<1, <<2 and <<3 indicate that the data is being effectively shifted left by 0, 1, 2 or 3 bits, respectively, depending on which multiplexer input is selected. In this known technique, the outputs of register 42 are each coupled to four different sets of inputs on multiplexer 44, so the selection of different multiplexer inputs effectively performs a 0, 1, 2 or 3-bit shift between register 42 and the output of multiplexer 44. By avoiding an actual shift operation in register 42, a clock cycle can be saved for each one-bit shift that would otherwise be required, while still obtaining the same results by shifting the data during its transfer from register 42 to XOR circuit 49.

A four-to-one multiplexer is shown for selecting 0, 1, 2 or 3-bit shifts. As those of ordinary skill in the art will appreciate, the invention can be designed to accommodate other quantities of inputs on the multiplexer and other shift values by using the same concept.

Global history array 46 contains a shift value and a transform for each branch instruction that will be predicted. For the selected branch instruction, the shift value determines how many bits Ghist1 needs to be shifted by selecting one of the input sets of multiplexer 44. The resulting output of multiplexer 44 is fed to one input of XOR circuit 49, while the transform associated with the selected branch instruction is fed to the other input of XOR circuit 49. XORing a shifted Ghist1 with the relevant transform produces Ghist4, which can be used as an index into prediction logic 48 to make a branch prediction for the selected branch instruction BR4. Prediction logic 48 can be a prediction array containing multiple locations, each location providing its own decisional logic.

Ghist4 is also delivered to an input of multiplexer 40. If the branch being predicted is to be used as the base branch for a subsequent prediction, its calculated history index can be fed from point 45 back to multiplexer 40 and loaded into register 42 to be used as the new base index.

The example described above can accommodate a 0–3 bit shift during the processing. This implies there will be no more than two intervening branch instructions of interest between the base branch instruction and the instruction to be predicted. Also, a shift-one-bit-and-XOR process was described. As those of ordinary skill in the art will appreciate, the invention can be designed to accommodate more or fewer intervening branch instructions, and a different algorithm can be used, without departing from the spirit or scope of the invention.

Figure 5:
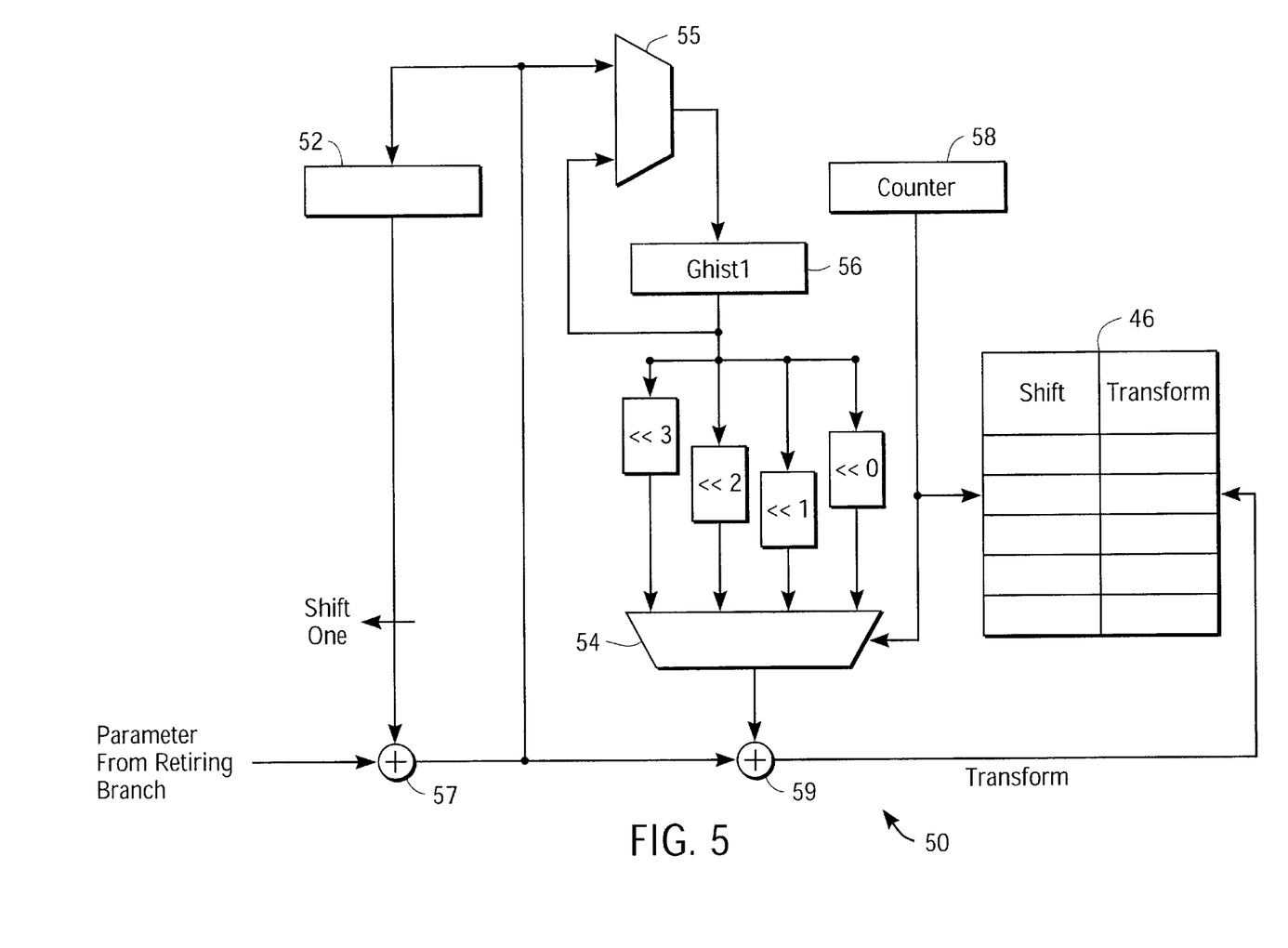
FIG. 5 shows a retirement circuit of the invention.

FIG. 5 shows retirement circuit 50, which is used to collect data when each branch instruction is retired (when it passes through stage 10 and exits the pipeline), and to place data in history array 46 for the branch to be predicted. The same array 46 is shown in both FIGS. 4 and 5. At the beginning of the sequence, counter 58 is reset to zero, and the initial base index value of Ghist1 is placed in registers 52 and 56, using multiplexer 55 to route the data to register 56. The output of register 52 is connected to one of the inputs of XOR circuit 57 in such a way as to shift the data one bit to the left. Since this shift function is always set at one bit, no equivalent to multiplexer 44 of FIG. 4 is needed here. As branch instruction BR1 is retired, its associated parameter A and the shifted Ghist1 are exclusively OR'd by XOR circuit 57 to produce Ghist2, which is placed back in register 52. At the same time, counter 58 is incremented. Multiplexer 55 now feeds and output of register 56 back to its own input, so that Ghist1 can be maintained in register 56 without turning off its clock. As branch instruction BR2 is retired, its associated parameter B is XOR'd by XOR circuit 57 with shifted Ghist2 to produce Ghist3. In a similar manner, when BR3 is retired, XOR circuit 57 produces Ghist4. Counter 58 is incremented each time to keep track of how many parameters have been operated upon. Once Ghist4 is produced, it will be XOR'd with a shifted Ghist1 by exclusive OR circuit 59. To shift the value of Ghist1 by the proper number of bits, a data shifting circuit 54 is used. This data shifting circuit operates similarly to its counterpart circuit 44 in FIG. 4, selecting different sets of inputs to effectively shift the data by 0, 1, 2 or 3 bits. Counter 58 provides the selection signal. This shifted value of Ghist1 can then be XOR'd by XOR circuit 59 with Ghist4 from XOR circuit 57. Because of the recombinant nature of exclusive OR logic, if XORing a shifted Ghist1 with the transform produces Ghist4 (see FIG. 3), then XORing a shifted Ghist1 with Ghist4 produces the same transform. Thus, the output of XOR circuit 59 is the same transform produced in FIG. 3 by XORing parameters A, B, and C. This quantity is then stored in global history array 46 in the location associated with BR4. The contents of counter 58 are also stored in the array as a shift value.

Each time a branch BR1, BR2 and BR3 is retired, counter 58 is incremented. When the transform is stored in array 46, the value of counter 58 is also stored as the shift value associated with the transform. The output of counter 58 is also used with multiplexer 54 to shift Ghist1 by selecting the correct multiplexer input.

In the manner just described, circuit 50 generates and stores a transform and a shift value for every branch instruction that is to be predicted. On a subsequent pass through the same set of instructions, circuit 30 uses the stored transform and shift value to predict whether the targeted branch instruction will or will not branch.

While the examples described involve predicting the branch status (branch or don't branch) of branch instructions in an execution pipeline that uses a global history array, the invention can also be used to predict the outcome of other types of elements, and more generally can be used to identify elements. Some of the terms used in deriving the final prediction have been referred to as indexes because that describes their function in connection with the prediction array of the examples. But these values could be used in other ways and the term 'index' should not be seen as a limitation on their use.

It is also possible to perform the described sequences in software or firmware. This type of implementation may not be fast enough for branch predictions with an instruction execution pipeline, but can be used to perform the same functions in an application with lesser speed requirements. The instructions can be stored on a machine-readable medium. When the instructions are read and executed by one or more devices, such as a computer, the aforementioned functions can be performed.

The foregoing description is intended to be illustrative and not limiting. Variations will occur to those of skill in the art. Those variations are intended to be included in the invention, which is limited only by the spirit and scope of the appended claims.

We claim:

1. A method, comprising:

providing at least three elements, including a first element and a last element, each element having an associated parameter;

providing a first identifier for the first element;
for a first sequential execution of the at least three elements, performing a first operation on the first identifier and at least one of the parameters to produce a transform;

saving the transform;

for a second sequential execution of the elements, performing a second operation on the transform to produce a last identifier associated with the last element, wherein performing the first operation includes:

performing a first logic function on the first identifier and the parameter associated with the first element to produce a next identifier for a next one of the elements;

repeating the performing a first logic function on the next identifier and the parameter associated with the next one of the elements, until a last identifier has been produced that is associated with the last element; and performing a second logic function on the first identifier and the last identifier to produce the transform.

2. The method of claim 1, wherein performing the first logic function includes:

shifting the first identifier to produce a shifted identifier; and performing an exclusive OR operation on the shifted identifier and the associated parameter to produce the next identifier.

3. The method of claim 2, wherein shifting the first identifier includes shifting the first identifier one bit to the left relative to the associated parameter.

4. The method of claim 1, wherein performing the second logic function includes:

shifting the first identifier to produce a shifted identifier; and performing an exclusive OR operation on the shifted identifier and the last identifier to produce the transform.

5. The method of claim 4, wherein shifting the first identifier includes shifting the first identifier to the left relative to the last identifier by a number of bits equal in value to one less than a quantity of the at least three elements.

6. The method of claim 1, wherein the at least three elements are branch instructions in an instruction execution pipeline.

7. The method of claim 1, further comprising:
using a last index to access a location in a prediction array; and
using a content of said location to predict a decision status of the last element.

8. A method comprising:
providing at least three elements, including a first element and a last element, each element having an associated parameter;
providing a first identifier for the first element;
for a first sequential execution of the at least three elements, performing a first operation on the first identifier and at least one of the parameters to produce a transform;
saving the transform; and
for a second sequential execution of the elements, performing a second operation on the transform to produce a last identifier associated with the last element, wherein performing the second operation includes
shifting the first identifier to produce a shifted identifier, wherein shifting the first identifier includes shifting the first identifier to the left relative to the transform by a number of bits equal in value to one less than a quantity of the at least three elements, and
performing an exclusive OR operation on the shifted identifier and the transform to produce the last identifier.

9. A circuit, comprising:
first and second exclusive OR circuits;
a first register having an output coupled to a first input of the first exclusive OR circuit and having an input coupled to an output of the first exclusive OR circuit;
a second register having an output coupled to a first input of the second exclusive OR circuit and having an input;
a multiplexer having an output coupled to the input of the second register, having a first input coupled to the output of the first exclusive OR circuit, and having a second input coupled to the output of the second register;
wherein the output of the first exclusive OR circuit is coupled to a second input of the second exclusive OR circuit.

10. The circuit of claim 9, wherein the first input of the first exclusive OR circuit is offset from the output of the first register to perform a bit-shift operation on data received from the first register by the first exclusive OR circuit.

11. The circuit of claim 9, wherein the second input of the multiplexer is offset from the output of the second register to perform a bit-shift operation on data received from the second register by the multiplexer.

12. The circuit of claim 9, further comprising an array coupled to an output of the second exclusive OR circuit to store transforms generated by the second exclusive OR circuit.

13. The circuit of claim 12, further comprising a counter to generate a shift value to store in the array.

14. A computer system, comprising:
an instruction execution pipeline; and
a branch prediction circuit coupled to the instruction execution pipeline and including:
first and second exclusive OR circuits;
a first register having an output coupled to a first input of the first exclusive OR circuit and having an input coupled to an output of the first exclusive OR circuit;
a second register having an output coupled to a first input of the second exclusive OR circuit and having an input; and
a multiplexer having an output coupled to the input of the second register, having a first input coupled to the output of the first exclusive OR circuit, and having a second input coupled to the output of the second register;
wherein the output of the first exclusive OR circuit is coupled to a second input of the second exclusive OR circuit.

15. The computer system of claim 14, wherein the first input of the first exclusive OR circuit is offset from the output of the first register to perform a bit-shift operation on data received from the first register by the first exclusive OR circuit.

16. The computer system of claim 14, wherein the second input of the multiplexer is offset from the output of the second register to perform a bit-shift operation on data received from the second register by the multiplexer.

17. The computer system of claim 14, further comprising an array coupled to an output of the second exclusive OR circuit to store transforms generated by the second exclusive OR circuit.

18. The computer system of claim 17, further comprising a counter to generate a shift value to store in the array.

19. A circuit, comprising:
a register;
a data shifting circuit having an input coupled to an output of the register;
an exclusive OR circuit having a first input coupled to an output of the data shifting circuit;
an array coupled to a second input of the exclusive OR circuit to transfer transform data to the exclusive OR circuit, and further coupled to the data shifting circuit to transfer data shift information to the data shifting circuit;
a prediction logic circuit coupled to an output of the exclusive OR circuit; and
a multiplexer having
an output coupled to an input of the register,
a first input to receive initial data, and
a second input coupled to the output of the exclusive OR circuit.

20. The circuit of claim 19, wherein the data shifting circuit includes a plurality of inputs coupled to the output of the register to shift data from the register by a selected number of bits.

21. A computer system comprising:
an instruction execution pipeline;
a transform generation circuit coupled to the instruction execution pipeline and including:
a register;
a data shifting circuit having an input coupled to an output of the register;
an exclusive OR circuit having a first input coupled to an output of the data shifting circuit;
an array coupled to a second input of the exclusive OR circuit to transfer transform data to the exclusive OR circuit, and further coupled to the data shifting circuit to transfer data shift information to the data shifting circuit; and
a prediction logic circuit coupled to an output of the exclusive OR circuit; and
a multiplexer having
an output coupled to an input of the register, a first input to receive initial data, and a second input coupled to the output of the exclusive OR circuit.

22. The computer system of claim 21, wherein the data shifting circuit includes a plurality of inputs coupled to the output of the register to shift data from the register by a selected number of bits.

23. A machine-readable medium having stored thereon instructions, which when executed by at least one processor cause said at least one processor to perform:

providing at least three elements, including a first element and a last element, each element having an associated parameter;

providing a first identifier for the first element;

for a first sequential execution of the at least three elements, performing a first operation on the first identifier and at least one of the parameters to produce a transform;

saving the transform;

for a second sequential execution of the elements, performing a second operation on the transform to produce a last identifier associated with the last element;

using the last identifier to access a location in a prediction array; and using a content of said location to predict a decision status of the last element, wherein performing the first operation includes:

performing a first logic function on the first identifier and the parameter associated with the first element to produce a next identifier for a next one of the elements;

repeating the performing a first logic function on the next identifier and the parameter associated with the next one of the elements, until a last identifier has been produced that is associated with the last element; and performing a second logic function on the first identifier and the last identifier to produce the transform.

* * * * *

UNITED STATES PATENT AND TRADEMARK OFFICE
CERTIFICATE OF CORRECTION

PATENT NO. : 6,715,064 B1
DATED : March 30, 2004
INVENTOR(S) : D'Sa et al.

It is certified that error appears in the above-identified patent and that said Letters Patent is hereby corrected as shown below:

<u>Column 1,</u>
Line 14, delete "procesor" and insert -- processor --.
Line 33, delete "hat" and insert -- that --.

<u>Column 5,</u>
Line 2, delete "result. 011110111110" and insert -- result 0011110111110 --

Signed and Sealed this

Fifth Day of October, 2004

JON W. DUDAS
*Director of the United States Patent and Trademark Office*